United States Patent

Takatori

[11] Patent Number: 5,864,376
[45] Date of Patent: Jan. 26, 1999

[54] LCD OF A SELECTED TWIST ANGLE THROUGH AN LC MATERIAL OF A SELECTED CHIRAL PITCH

[75] Inventor: Ken-Ichi Takatori, Tokyo, Japan

[73] Assignee: NEC Corporation, Tokyo, Japan

[21] Appl. No.: 768,506

[22] Filed: Dec. 18, 1996

Related U.S. Application Data

[63] Continuation-in-part of Ser. No. 427,103, Apr. 21, 1995.

[30] Foreign Application Priority Data

Apr. 21, 1994 [JP] Japan ..................... 6-83273

[51] Int. Cl.$^6$ .................. G02F 1/1337; G02F 1/141; G02F 1/13
[52] U.S. Cl. .................. 349/129; 349/129; 349/132; 349/136; 349/180
[58] Field of Search .................. 349/128, 129, 349/132, 136, 180

[56] References Cited

U.S. PATENT DOCUMENTS

| | | | |
|---|---|---|---|
| 4,653,865 | 3/1987 | Kando et al. ............. | 349/180 |
| 5,030,322 | 7/1991 | Shimada et al. ............ | 216/58 |
| 5,280,375 | 1/1994 | Tsuda et al. ............... | 349/136 |
| 5,473,455 | 12/1995 | Koike et al. .............. | 349/132 |

FOREIGN PATENT DOCUMENTS 63-106624   5/1988   Japan .

OTHER PUBLICATIONS

Koike, Y., et al., "Late–News Paper: A Full–Color TFT–LCD with a Domain–Divided Twisted–Nematic Structure", SID 92 Digest, pp. 798–801.

Takatori, K., et al., A Complementary TN LCD with Wide Viewing–Angle Grayscale, Japan Display 92, pp. 591–594.

Lien, R., et al., "Two–Domain TN–LCDs Fabricated by Parallel Fringe Field Method", SID 93 Digest, pp. 269–272.

Takatori, K., et al., "Splayed TN Configuration Stability in Domain–Divided TN Mode", Mol. Cryst. Liq. Cryst. 1995, vol. 263, pp. 445–458.

*Primary Examiner*—William L. Sikes
*Assistant Examiner*—Julie Ngo

[57] ABSTRACT

In a liquid crystal display device comprising a plurality of layer domains of a liquid crystal material between a first and a second substrate member with two adjacent ones of which domains made to serve as a first layer domain of a first twist angle of liquid crystal orientations and as a second layer domain of a second twist angle of liquid crystal orientations, an angle between the first and the second twist angles is selected between 80° and 100° with the liquid crystal material made to have a chiral pitch between 20 micrometers and 200 micrometers in each of the first and the second layer domains. Preferably, the liquid crystal orientations have a pretilt angle between 0° and 1.50° at an interface between the liquid crystal material layer domains and at least one of the first and the second substrate members.

6 Claims, 13 Drawing Sheets

LCD OF A SELECTED TWIST ANGLE THROUGH AN LC MATERIAL OF A SELECTED CHIRAL PITCH

This is a continuation-in-part, of application Ser. No. 08/427,103, filed Apr. 21, 1995.

BACKGROUND OF THE INVENTION

This invention relates to a liquid crystal display (LCD) device and to a method of manufacturing the same.

In the manner which will later be described in greater detail with reference to about a dozen of accompanying drawing figures, known are various liquid crystal devices in which a layer of a liquid crystal (LC) material is divided into a plurality of layer domains per pixel. When supplied with an electric voltage, the pixels show different contrast to provide a display of a pattern dependent on the voltage applied across each pixel. Such a multi-domain liquid crystal display device has a wide viewing angle of the display with an excellent contrast between those parts of the display which the pixels may correspond to either from pixel to pixel or from pixels of a segment to pixels of a background of the display.

The multi-domain liquid crystal display comprises first and second substrate members and the layer of liquid crystal display material between the first and the second substrate members. It will be presumed without loss of generality that the display is viewed by watching the first substrate member with the voltage applied across the first and the second substrate members. The pixels are usually defined by the second substrate member. Each substrate member comprises an alignment film in contact with the liquid crystal material. The layer domains are provided by processing the alignment films of the first and the second substrate members locally different in each pixel.

In each of such domains, the liquid crystal material has orientations which depend primarily on manners of processing the alignment films. Irrespective of the manners of processing, the orientations are subjected to a twist even when no voltage is applied across the first and the second substrate members. The twist results in a twist angle between the alignment films of the first and the second substrate members. Furthermore, the liquid crystal material has a chiral pitch specific to the material in a direction perpendicular to the first and the second substrate members when no voltage is applied between the substrate members.

As will be pointed out with reference to a few of the accompanying drawing figures later before describing this invention in detail, it has been confirmed by the present inventor that the layer domains have energy whose stability depends on the twist angle in each of the layer domains. This stability depends also on the chiral pitch. The viewing angle and the contrast primarily depend accordingly on the twist angle and the chiral pitch among others.

SUMMARY OF THE INVENTION

It is consequently an object of the present invention to provide a liquid crystal display device of a wide viewing angle.

It is another object of this invention to provide a liquid crystal display device which is of the type described and is capable of producing a display of an excellent contrast.

It is still another object of this invention to provide a liquid crystal display device which is of the type described and is operable with no defects in the display.

It is yet another object of this invention to provide a liquid crystal display device which is of the type described and is operable to provide a color display of excellent chromatic characteristics.

It is a further object of this invention to provide a liquid crystal display device comprising a liquid crystal material layer having a plurality of layer domains per pixel, which device is of the type described and in which device each layer domain is stabilized in energy.

It is a still further object of this invention to provide a liquid crystal display device which is of the type described and in which the layer domains are capable of keeping the viewing angle wide, the contrast excellent, the display with no defects, and/or the excellent chromatic characteristics even when a plurality of layer domains are subjected to an external force, such as a touch by the user's finger and to surrounding circumstances, such as an environmental temperature which gives rise to a variation in elastic constant of components of the liquid crystal display device.

It is a different object of this invention to provide a method of manufacturing a liquid crystal display device which is of the type described.

Other objects of this invention will become clear as the description proceeds.

In accordance with an aspect of this invention, there is provided a liquid crystal display device comprising a first and a second substrate member and a layer of a liquid crystal material between the first and the second substrate members with the first and the second substrate members processed to divide the layer into a plurality of layer domains, in a first and a second layer domain of two adjacent ones of which a first tilt direction of liquid crystal orientations is different from a second tilt direction of liquid crystal orientations, wherein the first and the second layer domains are formed to form an angle between 80° and 100° between the first and the second tilt directions with each of the first and the second tilt directions given a chiral pitch between 20 micrometers and 200 micrometers.

In accordance with a different aspect of this invention, there is provided a method of manufacturing a liquid crystal display device comprising the steps of preparing a first and a second substrate member and filling a layer of a liquid crystal material between the first and the second substrate members with the first and the second substrate members processed during the preparing step to divide the layer into a plurality of layer domains, in a first and a second layer domain of two adjacent ones of which a first tilt direction of liquid crystal orientations is different from a second tilt direction of liquid crystal orientations, wherein the first and the second substrate members are processed in the preparing step to form between the first and the second tilt directions a twist angle between 80° and 100° with each of the first and the second tilt directions given a chiral pitch between 20 micrometers and 200 micrometers.

DESCRIPTION OF THE PREFERRED EMBODIMENTS

FIGS. 1 through 14 will first be referred to for description of a few conventional improvements in a liquid crystal display (LCD) device or panel and problems involved therein. This is in order to facilitate an understanding of the present invention.

Figure 1:
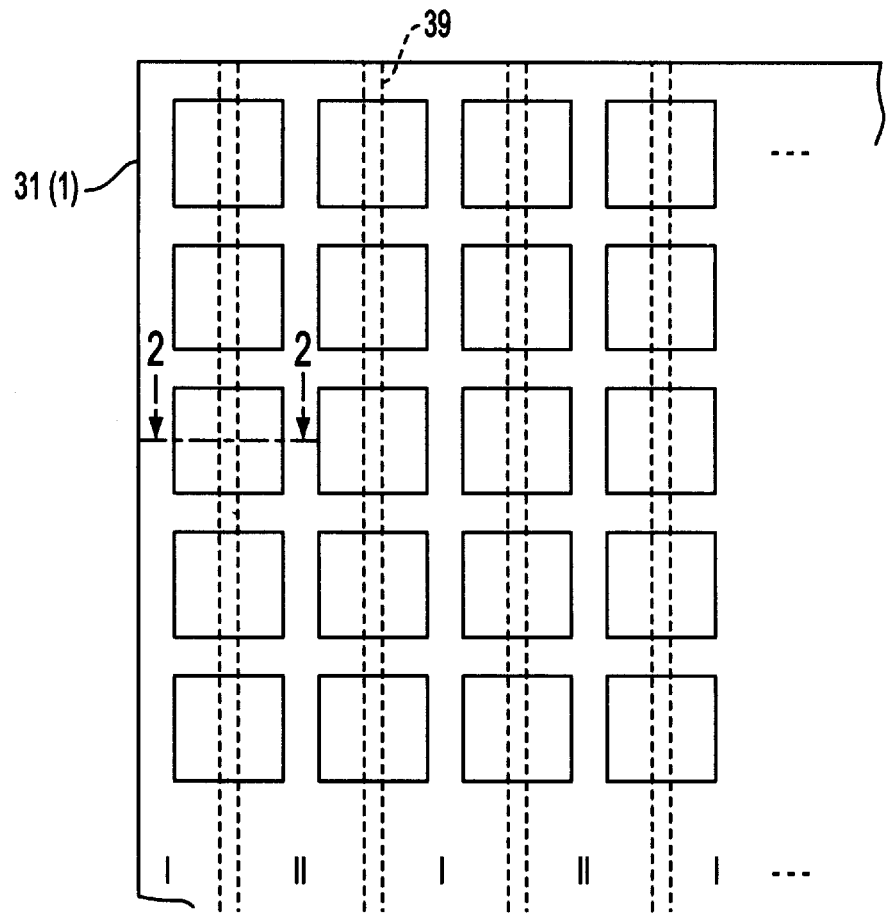
FIG. 1 is a top view of a typical conventional liquid crystal display device.
Figure 2:
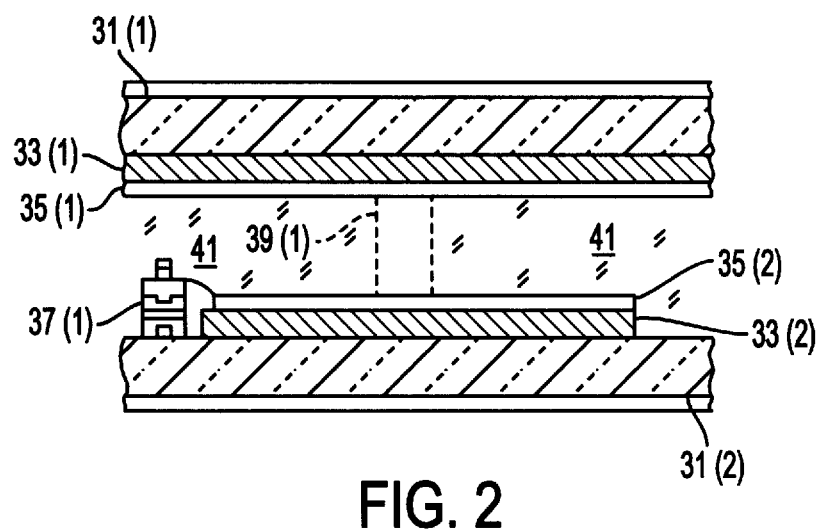
FIG. 2 is a vertical sectional view taken on line 2—2 of FIG. 1 to show a structure of a liquid crystal display device in general.
Figure 3:
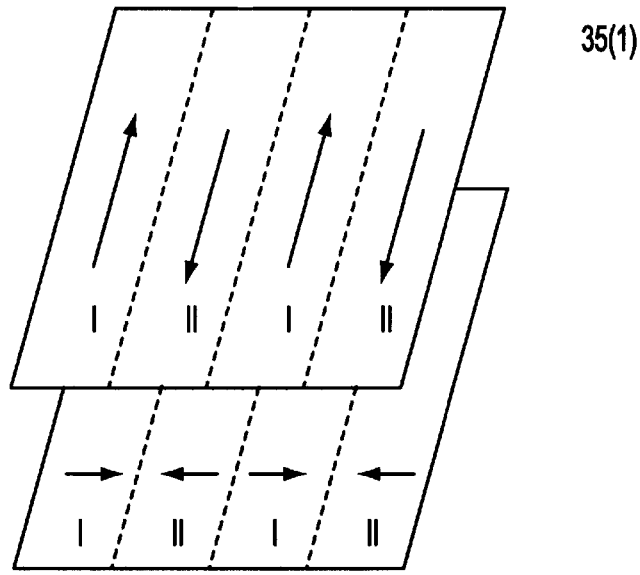
FIG. 3 is a perspective view of a part of the typical conventional liquid crystal display device.

Referring to FIGS. 1 through 3, a liquid crystal display device is what is disclosed in Japanese Patent Prepublication (A) No. 106,624 of 1988 by TANUMA Kiyoharu and two others. The liquid crystal display device comprises a top or front glass substrate 31(1) and a bottom or back glass substrate 31(2). Between the top and the bottom glass substrates 31 (suffixes 1 and 2 omitted), a plurality of liquid crystal pixels are arranged in columns and rows as best exemplified in FIG. 1.

Each pixel is square in outline. In the manner depicted in FIG. 2, a top transparent electrode 33(1) is extended in contact with the top glass substrate 31(1). Each pixel is defined by a bottom transparent electrode 33(2). Such bottom transparent electrodes and the top transparent electrode will collectively be designated by a simple reference numeral 33. Brought into contact with the top transparent electrode and the bottom transparent electrodes 33 are a top or common alignment film 35(1) and back or individual alignment film 35(2) which top and bottom alignment films are typically made of polyimide and which will collectively be designated merely by 35. Thin-film transistors (TFT) 37 are connected to the back transparent electrodes 33(2), respectively, at points of connection. Each bottom orientation film 35(2) is typically 200 micrometers long and wide.

In FIGS. 1 and 2, a top longitudinal spacer 39(1) are extended on the top alignment film 35(1) centrally along each column of the pixels. A bottom longitudinal spacer 39(2) is extended on the bottom alignment films 35(2) of the pixels of each column centrally of these pixels. Such top and bottom longitudinal spacers are later brought into contact with united longitudinal spacers 39 and are made typically of polyimide with each of the top and the bottom longitudinal spacers 39 given a thickness of typically 10 micrometers. It is to be noted in FIG. 2 that the reference numerals 39(1) and 39(2) are not used but the simple reference numeral 39. Such longitudinal spacer 39 is depicted by dashed lines in FIG. 2 because the longitudinal spacers 39 are not always necessary.

In the manner indicated in FIGS. 1 through 3, the top alignment film and the bottom alignment films 35 are divided by the longitudinal spacers 39 into first and second film domains or regions I and II which are subjected to a rubbing operation or treatment in two orthogonal rubbing directions indicated by orthogonal antiparallel arrows in FIG. 3. Subsequently, a liquid crystal material is filled between the top and the bottom glass substrates 31 with the top and the bottom alignment films 35 and the thin-film transistors 37 in the manner known in the art to form a liquid crystal layer 41. By the first and the second film domains of the alignment films 35, the liquid crystal layer 41 is divided into first and second layer domains I and II.

Figure 4:
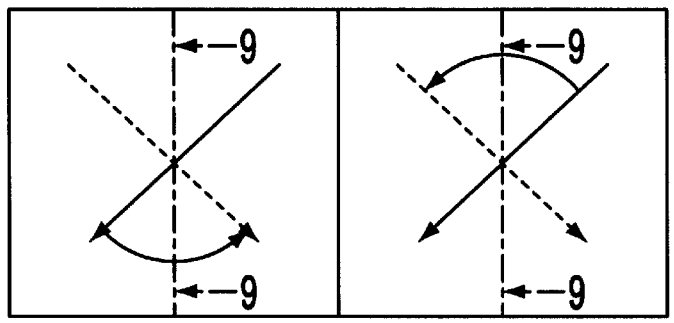
FIG. 4 is a top view of a pixel of the typical conventional liquid crystal display device.

Referring again to FIGS. 1 and 2 and afresh to FIG. 4, a liquid crystal display device is what is revealed in a paper contributed by T. Koike and five others to the SID 92 Digest, 1992, pages 798 to 801, as Paper No. 41.5 under the title of "Late-News Paper: A Full-Color TFT-LCD with a Domain-Divided Twisted-Nematic Structure". In FIGS. 1 and 2, the structure is similar in concepts.

Use is not made of the longitudinal spacers 39. Instead of the first film domain I, a region A is formed on the top transparent electrode 33(1) by an inorganic film with no cover thereon of an organic film of polyimide and on each bottom transparent electrode 33(2) by the inorganic film covered with the organic film. Instead of the second film domain II, another region B is formed on the top transparent electrode 33(1) by the inorganic film covered with the organic film and on each bottom transparent electrode 33(2) by the inorganic film with no cover thereon of the organic film. Such a combination of the inorganic and the organic films serves as a front or a bottom alignment film.

In FIG. 4, only one rubbing direction is used for the regions A and B of the first alignment film depicted as left and right squares in the manner indicated by solid-line arrows. An orthogonal rubbing direction is used for the region of the bottom alignment film as depicted by dashed-line arrows for the regions A and B depicted as a top view.

Figure 5:
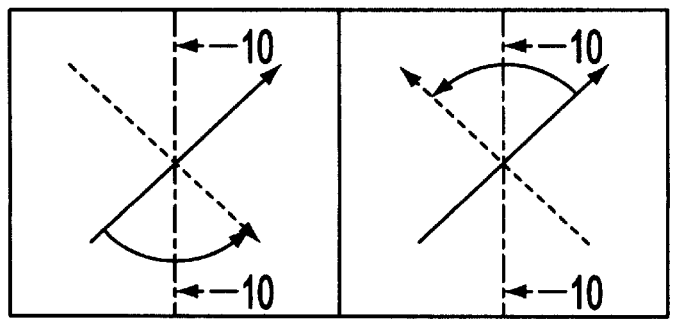
FIG. 5 is a top view of a pixel of a first improved conventional liquid crystal display device.

Referring further again to FIGS. 1 and 2 and afresh to FIG. 5, a liquid crystal device is what is revealed in a paper contributed by K. Takatori and three others to the Japan Display, 1992, pages 591 to 594, as Paper No. S15-6 under the title of "A Complementary TN LCD with Wide-Viewing-Angle Grayscale". Among the contributors, K. Takatori is the present inventor.

In FIGS. 1 and 2, the structure is similar in principle to those of Tanuma et al and of Koike et al. Use is made of neither the longitudinal spacers 39 nor combinations of the inorganic and the organic films. The front alignment film 35(1) has no particular distinction between the first and the second film domains. Only each bottom alignment film 35(2) is differently rubbing processed at the first and the second film domains as will be described in the following.

In FIG. 5, only one rubbing direction is used on the first alignment film 35(1) as indicated by solid-line arrows in the left and the right squares. A pair of antiparallel rubbing directions is used on each bottom alignment film 35(2) as indicated by dashed-line arrows in the first and the second film domains I and II depicted as a top view.

Figure 6:
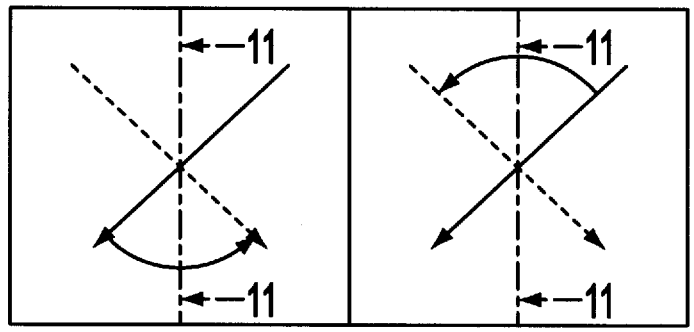
FIG. 6 is a top view of a pixel of a second improved conventional liquid crystal display device.

Referring still further again to FIGS. 1 and 2 and afresh to FIG. 6, a liquid crystal display device is what is revealed in a paper contributed by A. Lien and another to the SID 93 Digest, pages 269 to 272, as Paper No. 19.2 under the title of "Two-Domain TN-LCDs Fabricated by Parallel Fringe Field Method". It appears that the structure is similar to that described above in connection with the Takatori et al paper. Each bottom transparent electrode 33(2) is called a pixel electrode.

Although not depicted in FIGS. 1 and 2, a slot is cut out of the front transparent electrode 33(1) centrally for each pixel. It will be assumed merely for convenience of the description which follows that such slots extend horizontally in FIG. 1. The front and the bottom transparent electrodes 33 are not divided into the first and the second film domains of the type described above.

In FIG. 6, only one rubbing direction is used on each of the front and the bottom transparent electrodes 33. More specifically, the rubbing direction on the front transparent electrode 33(1) is indicated by solid-line arrows for the first and the second film domains. The rubbing direction on the bottom transparent electrodes 33(2) is indicated by dashed-line arrows when viewed through the front transparent electrode 33(1).

Figure 7:
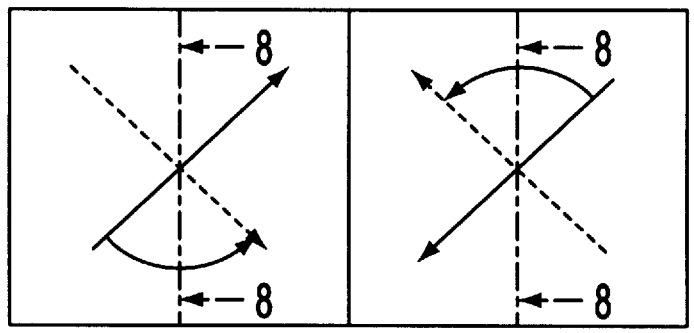
FIG. 7 is a top view of a pixel of a third improved conventional liquid crystal display device.
Figure 8:
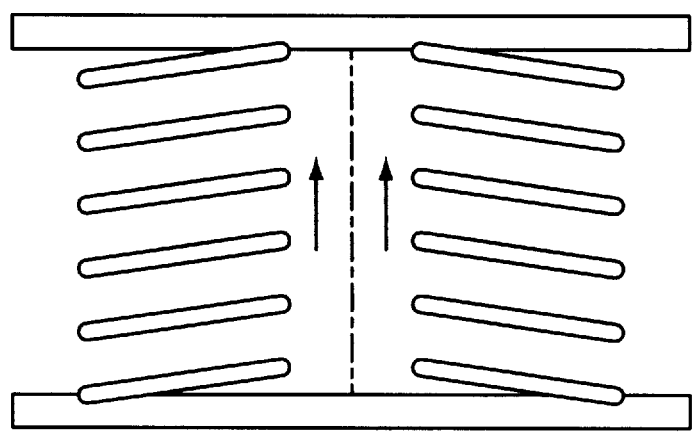
FIG. 8 is a vertical sectional view taken on line 8—8 of FIG. 7.

Turning to FIGS. 7 and 8, the rubbing directions of FIG. 3 are schematically depicted in FIG. 7 for the first and the second film domains depicted as left and right squares. The rubbing directions on the front alignment film 35(1) are indicated by solid-line arrows. Those on each bottom alignment film 35(2) are indicated by dashed-line arrows when viewed through the front alignment film 35(1). In the liquid crystal layer 41, the liquid crystal material has orientations subjected to a helical twist or tilt between the top and the bottom alignment films 35 of FIG. 2. The helical twist gives rise to rotation of the orientation from the rubbing direction on the top alignment film 35(1) to that of the bottom alignment film 35(2) in the first and the second layer domains I and II in the manner indicated by arcuate arrows. The orientations will often be referred to as molecules.

In FIG. 8, the top and the bottom glass substrates 31 of FIG. 2 are depicted by top and bottom rectangles together with the top and the bottom transparent electrodes 33, the top and the bottom alignment films 35, and the thin-film transistors 37. The longitudinal spacers 39 of FIG. 2 are not depicted in view of the liquid crystal display devices of Koike et al, Takatori et al, and Lien et al. The first and the second layer domains I and II are depicted on the left and the right sides of a vertical dashed line.

At each surface of the top and the bottom glass substrates 31 of FIG. 2, an alignment control force builds up in a direction depicted. The liquid crystal molecules are arranged in different directions in the first and the second layer domains I and II relative to a device plane defined by the top and the bottom glass substrates 31. Angles of such directions are called pretilt angles.

It will be assumed in FIGS. 1 and 2 that an electric field is applied across the top and the bottom transparent electrodes 33 through the thin-film transistors 37.

In FIG. 8, the liquid crystal molecules build up in tilt directions indicated in the first and the second layer regions I and II by upright arrows. As a result, optical characteristics of the liquid crystal layer 41 compensate in the first and the second layer regions for each other even when light is incident on the liquid crystal display device obliquely rather than in normal to the device plane. As a further result, a contrast angular dependence of a liquid crystal display is compensated for in the first and the second layer regions. In particular, no reversal of image appears in the liquid crystal display even in a variation in a viewing angle of a grayscale display. This would be the reason why the liquid crystal display device of Tanuma et al has, as described in the Japanese patent prepublication, a transmittance which little depends on the viewing angle.

Again referring to FIG. 4, the liquid crystal molecules are subjected to the helical twist which is indicated in the regions A and B of Koike et al by arcuate arrows. This helical twist is not different from that is herein analyzed in connection with the first and the second regions of Tanuma et al.

Figure 9:
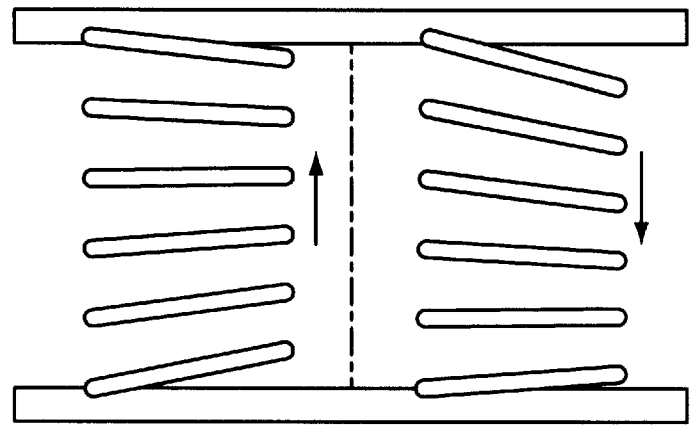
FIG. 9 is a vertical sectional view taken on line 9—9 of FIG. 4.

Turning to FIG. 9, the liquid crystal molecules are exemplified like in FIG. 8 in the regions A and B of Koike et al. The alignment control force builds up in the directions shown. Here, the pretilt angle is greater in the region A near the organic film than near the inorganic film. The pretilt angle is greater in the region B also near the organic film than near the inorganic film. When the electric field is applied across the top and the bottom transparent electrodes 33 of FIG. 2, the molecules build up in the regions A and B in opposite directions indicated by an upward and a downward directed arrows.

Again referring to FIG. 5, the liquid crystal molecules are subjected to the helical twist indicated in the first and the second domains of Takatori et al by arcuate arrows. The direction of the helical twist is not different from that illustrated in FIGS. 4 and 7.

Figure 10:
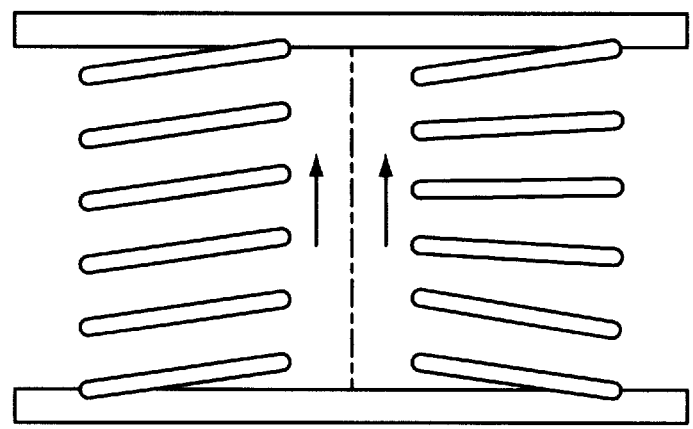
FIG. 10 is a vertical sectional view taken on line 10—10 of FIG. 5.

Turning to FIG. 10, the liquid crystal molecules are exemplified like in FIGS. 8 and 9 in the first and the second regions I and II of Takatori et al. The alignment control force builds up in the direction shown. The pretilt angle is greater in both the first and the second layer domains near the bottom glass substrate than near the top glass substrate. The alignment control force has directions which are opposite to the pretilt angles in the first and the second layer domains. When the electric field is applied, the molecules build up in the directions indicated by upright arrows.

Again referring to FIG. 6, the liquid crystal molecules are subjected to the helical twist in the liquid crystal display device of Lien et al in the manner indicated by arcuate arrows. As described before, the rubbing directions and the helical twist are depicted like in FIGS. 4, 5, and 7 merely for convenience of comparison.

Figure 11:
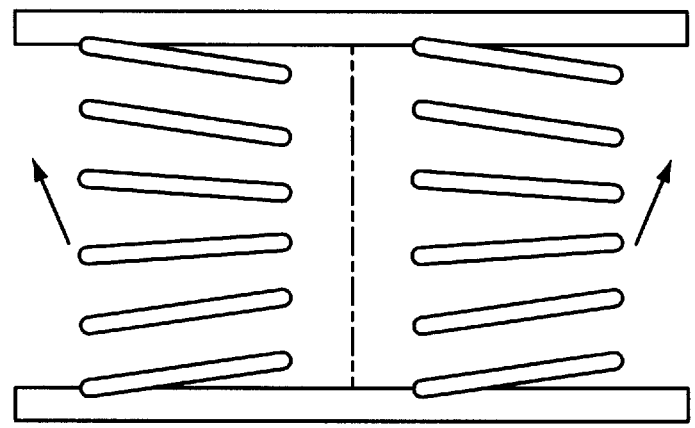
FIG. 11 is a vertical sectional view taken on line 11—11 of FIG. 6.

Turning to FIG. 11, the liquid crystal molecules are exemplified in the liquid crystal display layer of Lien et al like in FIGS. 8 through 10. The alignment control force builds up in the direction shown. The pretilt angles are equal in absolute value near the first and the second alignment films 35 described in conjunction with FIG. 2. When no electric field is applied across the transparent electrodes, the molecules are held parallel to the device plane near the slot. When the electric field is applied, the molecules obliquely build up as indicated by oblique arrows at portions nearer to the top and the bottom alignment films 35 of FIG. 2.

Reviewing FIGS. 1 through 11, it is understood that manufacture or fabrication process is simplified in Koike et al, Takatori et al, and Lien et al as compared with the liquid crystal display device of Tanuma et al where antiparallel rubbing directions must be used in stripe domains I and II of two kinds and furthermore on the top and the second alignment film 35. Each of the liquid crystal display devices of Tanuma et al, Koike et al, Takatori et al, and Lien et al has a well compensated optical characteristic of resulting in little angular dependence of the viewing angle.

It is, however, indispensable in order to achieve the little angular dependence in a wide viewing angle range that the liquid crystal display layer stably be divided into a plurality of domains, such as the domains I and II, the regions A and B, or domains with which each liquid crystal pixel is divided into upper and lower domains when each slot is horizontal as assumed above. Compensation in the optical characteristics is often adversely affected either by application of a strong electric field across the alignment films 35 or by application of an external force, such as manual touch, to the top or the bottom glass substrate 31. It has furthermore been found by the present inventor that such an adverse affect results from a variation in an environmental temperature which gives rise to variations in elastic constants of components of the liquid crystal display device and therefore to the twist angle, the chiral pitch, the pretilt angle, and others.

This defect has often taken place in the liquid crystal display devices of Koike et al, Takatori et al, and Lien et al. Analyzing the defect, the present inventor has confirmed the following.

In Koike et al, Takatori et al, and Lien et al, manufacture of the liquid crystal display devices has been simplified as compared with the manufacture by Tanuma et al as regards the little angular dependence of viewing angle achieved. This is rendered possible by varying orientation of the liquid crystal molecules in at least one of the domains, as in the regions A and B of Koike et al (FIG. 9), the second region II of Takatori et al (FIG. 10), and the upper and the lower domains of Lien et al (FIG. 11). The orientation in these domains will herein be referred to as "π-type pretilt" (or "sprayed configuration") in contrast to that in the first and the second regions I and II of Tanuma et al (FIG. 8) and in the first region I of Takatori et al. This latter orientation is herein called "normal pretilt". When attention is directed to energy, the orientation of the π-type pretilt is less stable than that of the normal pretilt.

Figure 27:
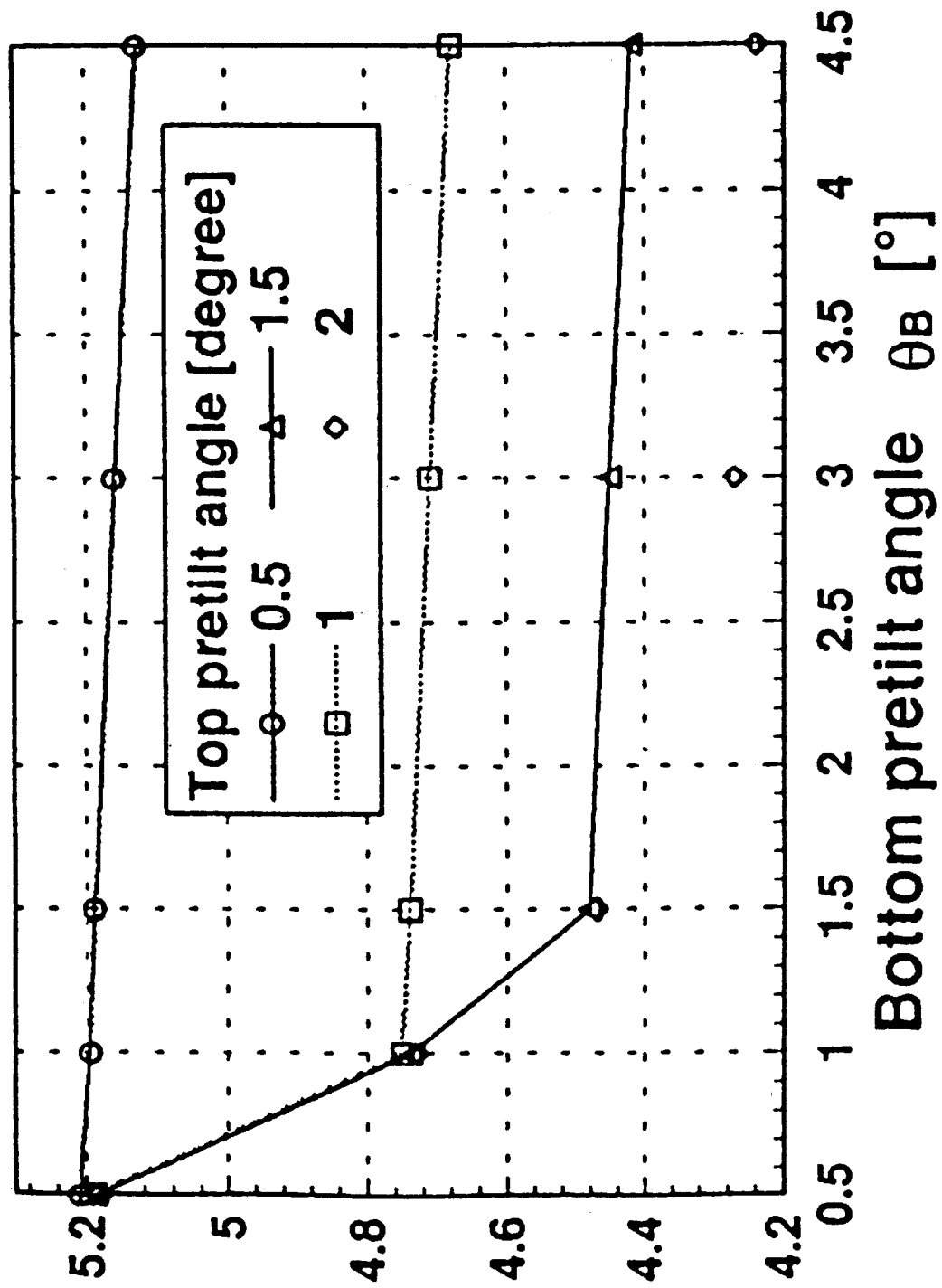
FIG. 27 is a graph of balanced voltage as a function of pretilt angle.

FIG. 27 shows the balanced voltages in a simulation analysis as a function of top and bottom pretilt angles with a twist angle of ninety degrees and a chiral pitch of fifty microns. It is seen in FIG. 27 that a lower pretilt angle on either substrate stabilizes the splayed TN configuration.

Figure 12:
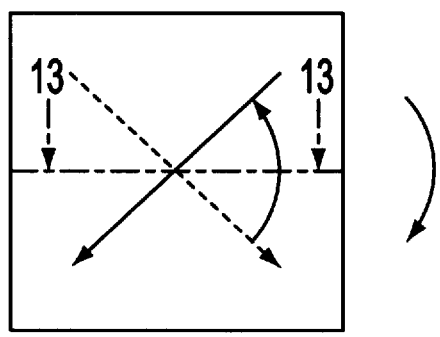
FIG. 12 shows a top view of a pixel of a general liquid crystal display device together with a natural twist in orientations of a liquid crystal display material used therein.
Figure 13:
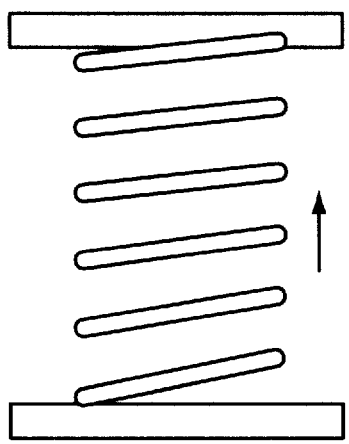
FIG. 13 is a vertical sectional view taken on line 13—13 of FIG. 12.

Referring to FIGS. 12 and 13, it should furthermore be noted that the helical twist may be in one of two opposite directions between the top and the bottom alignment films 33 described in connection with FIG. 2. One of the opposite directions is indicated by a downwardly directed arcuate arrow on a right side of a domain indicated by a square. This direction of helical twist is natural or inherent to the liquid crystal molecules and will herein be called a "normal twist". The other direction is indicated in the square by an upwardly directed arcuate arrow and will herein be called a "reverse twist". Being opposite to the normal twist, the reverse twist is caused to the molecules with a less stability when attention is directed to energy. Incidentally, angles of build up of the liquid crystal material molecules at each of the alignment films 35 depend on chemical structures of the polyimide.

Referring again to FIGS. 4, 9, 12, and 13, the normal and the π-type pretilts and the normal and the reverse twists will collectively be taken into consideration. In FIG. 12, the liquid crystal molecules are subjected to the reverse twist. Their energy is therefore less stable than that of the molecules which undergo the normal twist in FIG. 4 in the region A. The molecules in FIG. 12 are, however, subjected to the normal pretilt as shown in FIG. 13. As a consequence, the molecules build up in FIGS. 12 and 13 with a stabler energy than the molecules which are of the -type pretilt in the region A of FIG. 9. That is, it would be possible to arrange the molecules in the normal pretilt and moreover in the reverse twist as in FIGS. 12 and 13 rather than as in the region A of FIGS. 4 and 9. It is furthermore understood that these two arrangements would readily change from one to the other when the energy is great or small.

Figure 14:
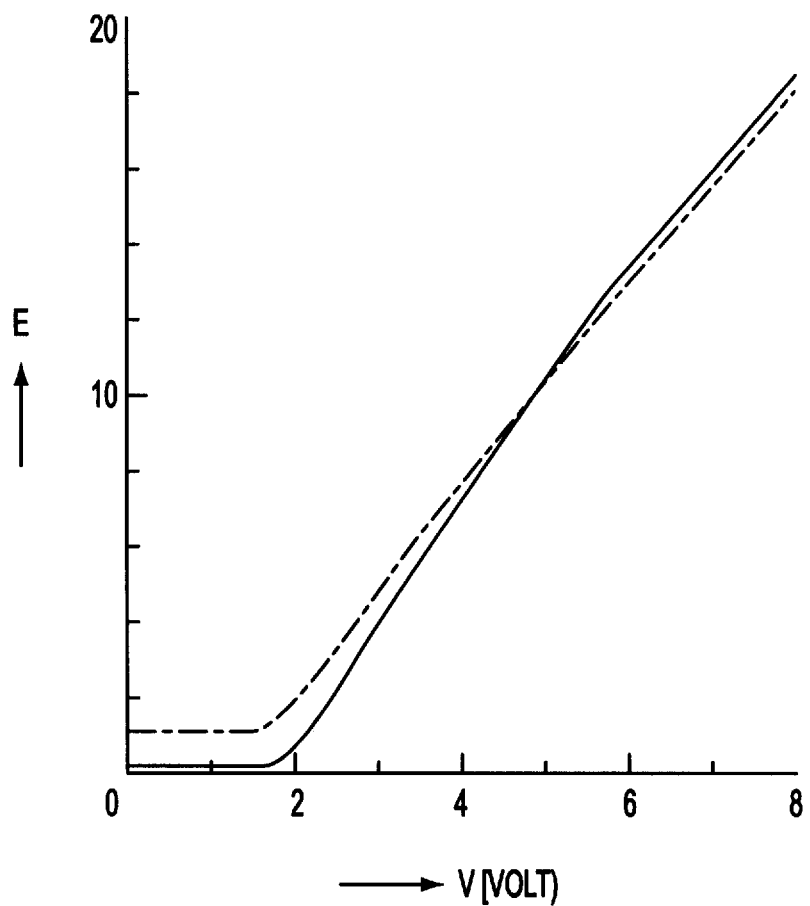
FIG. 14 shows characteristics of the general liquid crystal display device.

Turning to FIG. 14 with FIGS. 1 and 2 additionally referred to, energy E is calculated for various voltages V applied across the transparent electrodes 33. The energy is depicted by a solid-line curve as regards an arrangement of the liquid crystal molecules in the π-type pretilt and the normal twist and by a dash-dot curve for the arrangement in the normal pretilt and the reverse twist.

In both arrangements, the molecules build up in a direction of electric field when the voltage is raised. The energy therefore grows greater as compared with the energy of a steady or quiescent state of no electric field when the voltage is applied. It should be noted that the molecules have the stabler energy in the steady state in the π-type pretilt and the normal twist than in the normal pretilt and reverse twist and a less stable energy when the voltage is high and that the arrangement of the molecules would change. It is not clear why this change takes place. It has, however, been confirmed from a scope image of a polarization microscope capable of watching the orientation of the liquid crystal molecules that this change takes place in the conventional liquid crystal display devices when improvements disappears in their viewing angle characteristics.

For example, attention will be directed to a liquid crystal display device in which each pixel is divided into two domains. If one of the domains undergoes such a change in orientation, it is clear that compensation for visual characteristics disappears. When both domains undergo the change, the pixels of the liquid crystal display device are subjected to individual changes to result in a display in which (image) sticking is observed. In addition, it should be noted that a structure of the π-type pretilt and the normal twist does not necessarily immediately change to another structure of the normal pretilt and the reverse twist when applied with the voltage under which the former structure is less stable in energy than the latter structure. It is, however, understood that this change is urged to give rise to a loss in the improvement in the visual angle characteristics when the external force is exerted on the liquid crystal display device as by a touch of a user's finger and/or when a variation takes place in the surrounding circumstances, such as variations in an environmental or ambient temperature.

It is not clear why the change takes place between the structures either when the voltage is high or when an external force is applied to the liquid crystal device and/or when a variation takes place in the surrounding circumstances, such as variations in an environmental or ambient temperature. It is, however, possible to study the circumstances of various effects of giving rise to the change and to stabilize the energy of a desirable structure, namely, to avoid undesirable variations in the orientations in a direction of twist. It is also possible to study what contrast capability would the liquid crystal display device show under the circumstances.

Referring afresh to FIG. 15 and again to FIG. 2, the description will now proceed to a liquid crystal display device according to a first embodiment of this invention. Similar parts are designated by like Am reference numerals and are similarly operable. In the example being illustrated, the liquid crystal device is similar in structure to that illustrated with reference to FIGS. 1, 2, 5, and 10.

Figure 15:
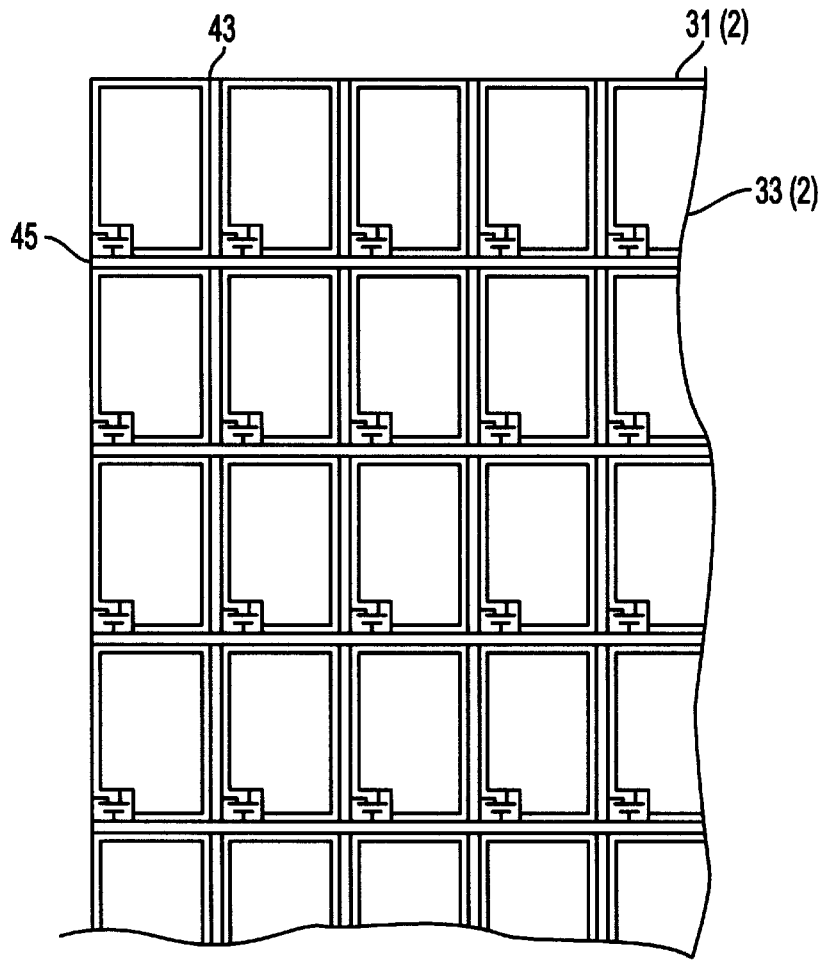
FIG. 15 is a top view of a bottom substrate member of a liquid crystal display device according to a first embodiment of the instant invention.

On the top glass substrate 31(2), the top transparent electrode 33(1) and the top alignment film 35(1) are formed in the manner described in conjunction with FIG. 1. In FIG. 15, the bottom transparent electrodes of indium tin oxide (ITO) 33(2) are sputtered onto the bottom glass substrate 31(2) in an array of columns and rows. Each bottom transparent electrode defines a pixel of a liquid crystal display device and has in FIG. 15 a height of 150 micrometers and a width of 100 micrometers. The bottom alignment films of polyimide 35(2) are coated on the bottom transparent electrode 33(2). The thin-film transistors of amorphous silicon 37 are formed on the bottom glass substrate 31(2) with silicon nitride ($SiN_x$) used as gate insulator films.

Signal leads of chromium 43 are sputtered onto the bottom glass substrate 31(2) in electric contact with gate electrodes of the thin-film transistors 37. Insulated from the signal leads 43 in the manner known in the art, scan electrodes of chromium 45 are sputtered onto the bottom glass substrate 31(2) in electric contact with source electrodes of the transistors 37. Each of the signal and the scan leads 43 and 45 is 10 micrometers wide. Drain electrodes of the transistors 37 are connected to the bottom transparent films 33(2).

On the top glass substrate 31(1), color filters (not shown) are formed in an array by dying and are covered with a layer of silica. The color filters are for red, green, and blue.

Top and bottom substrate members are manufactured in the manner described in the foregoing. The top and the bottom substrate members are held parallel with a space kept by spacers (not shown) in the known manner into a substrate assembly. The space is selected as exemplified as the description proceeds. Depending on the circumstances, the bottom substrate member consists of the bottom glass substrate 31(2), the bottom transparent electrodes 33(2), and the bottom alignment films 35(2). On both sides of the substrate assembly with the color filters and the layer of silica, attached are top and bottom polarizing plates (not shown) which include polycarbonates as main components.

Figure 16:
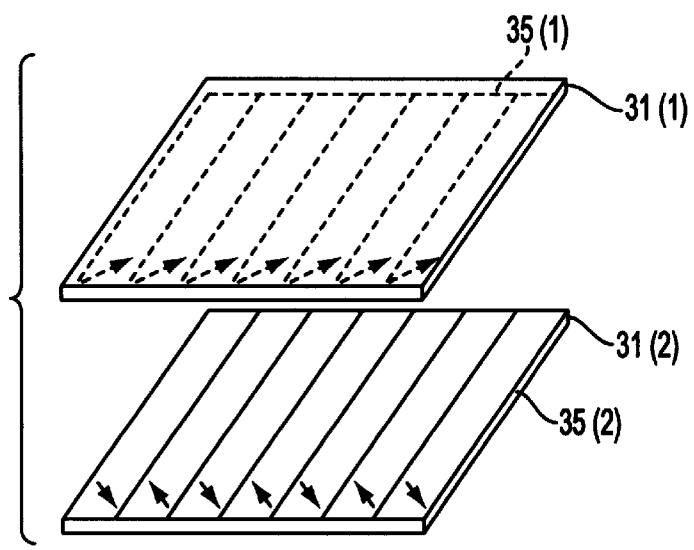
FIG. 16 is a perspective view of a part of the liquid crystal display device illustrated in FIG. 15.

Turning to FIG. 16 with FIGS. 2 and 15 additionally referred to, the rubbing process is applied to the top alignment film 35(1) in a direction and a sense which are generally indicated by dashed-line arrows. The rubbing process is applied twice on the bottom alignment films 35(2) with directions with senses which are indicated in general by solid-line arrows.

More particularly, the rubbing process was applied to the top alignment film 35(1) with an azimuthal angle selected from cases I through V in Table along a first column under a first indication of 35(1). To the bottom alignment films 35(2), the rubbing process was first applied as indicated by rightwardly directed arrows with its azimuthal angle selected from the cases I through V along a second column under a second indication of 35(2)-1. Photoresist was coated on the bottom alignment films 35(2) subjected to this rubbing process. With the bottom alignment films 35(2) half masked along row-wise stripes, each 75 micrometers wide, and exposed to light. Removing unexposed halves by development, the 10 second alignment films 35(2) were subjected to the rubbing process for a second time as indicated by leftwardly directed arrows which are antiparallel to the rightwardly directed arrows with an azimuthal angle selected from the cases I through V along a third column under a third indication of 35(2)-2.

TABLE

| | (in degrees) | | | |
|---|---|---|---|---|
| Case | 35(1) | 35(2)-1 | 35(2)-2 | Twist angle |
| I | 310 | 230 | 50 | 80 |
| II | 312.5 | 227.5 | 47.5 | 85 |
| III | 315 | 225 | 45 | 90 |
| IV | 317.5 | 222.5 | 42.5 | 95 |
| V | 320 | 220 | 40 | 100 |

After removal of remaining photoresist, the top and the bottom substrate members were assembled into the substrate assembly. The layer 41 of a nematic liquid crystal material having a chiral pitch $P_\chi$ and a positive optical dielectric anisotropy was filled in the substrate assembly. The chiral pitch was varied in five pitch degrees by adjusting amounts of added chiral molecules. The five pitch degrees were 20, 50, 100, 150, and 200 micrometers. At any rate, the layer 41 of the liquid crystal material is divided into first and second layer domains of row-wise stripes.

Figure 17:
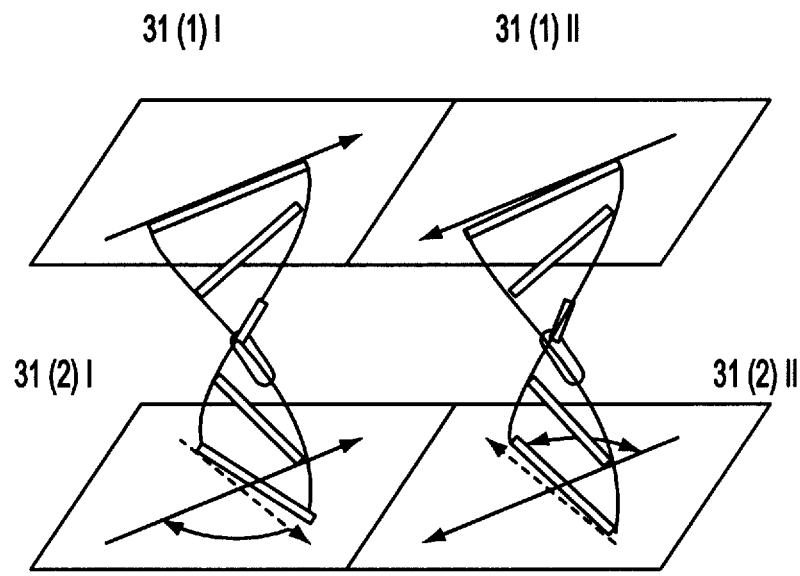
FIG. 17 is a schematic perspective view of a pixel of the liquid crystal display device depicted in FIG. 15.

Further turning to FIG. 17 with FIGS. 2 and 15 continuously referred to, the top and the bottom substrate members are divided into first and second top member domains 31(1)I and 31(1)II and into first and second bottom member domains 31(2)I and 31(2)II. The first and the top or bottom member domains are in correspondence to the first and the second layer domains and are nevertheless depicted horizontally rather than vertically. Directions of the rubbing process on the top substrate member are indicated by thick solid-line arrows. The direction of this rubbing is indicated with its sense reversed merely for convenience. Directions of first and second rubbing processes on the bottom substrate member are indicated by dashed-line arrows.

In the layer 41, the liquid crystal material has orientations depicted by elongate rectangles. An orthogonal projection of the orientation on the top substrate member on the bottom substrate member is depicted by thin solid-line arrows. Between the top and the bottom the orientations in each of the first and the second substrate members have a twist angle which depends on the cases I through V as listed in Table 1 and is indicated by arcuate arrows. The chiral pitch is decided by the liquid crystal material in the manner described before. Incidentally, the orientation forms an angle of about 1.5° on the top substrate member relative to the direction of the rubbing process. On the bottom substrate member, the orientation forms an angle of about 3.5° with the direction of rubbing of the first and the second times.

Figure 18:
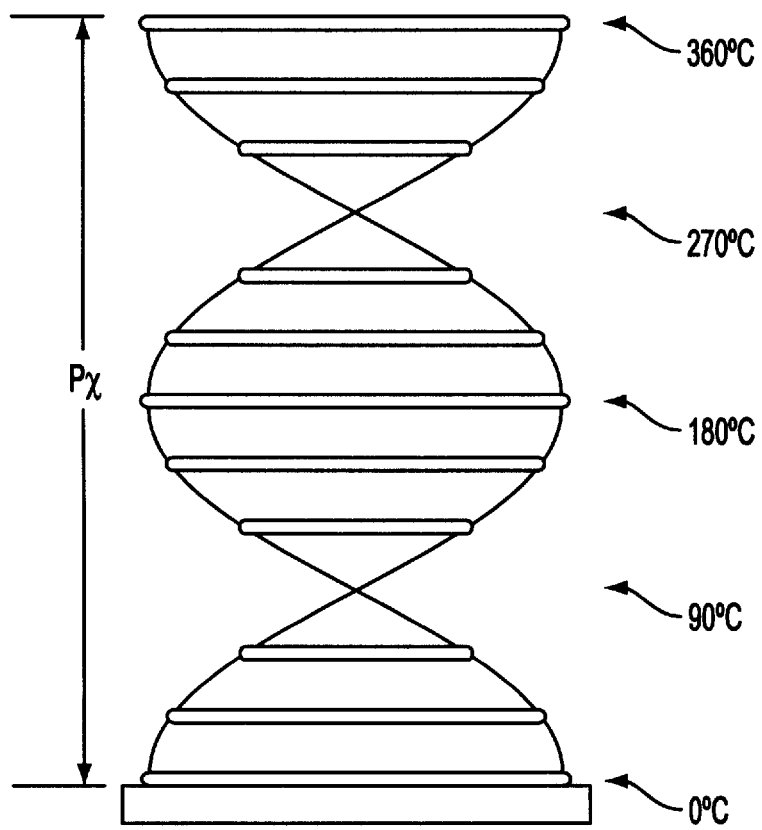
FIG. 18 shows a chiral pitch of a liquid crystal material.

Referring temporarily to FIG. 18, one of the top and the bottom glass substrates 31 (FIG. 2) is depicted by a rectangle. The liquid crystal material has directions depicted by thick horizontal lines. For use as the liquid crystal material at present, the chiral molecules are added to the nematic liquid crystal material to a certain extent. The direction is therefore subjected to a twist between the top and the bottom glass substrates 31 even when no twist force is specifically applied. As a consequence, the orientation varies along an axis of a helix from 0° on the glass substrate continuously to 90°, 180°, 270°, and 360°. A pitch of the helix is called the chiral pitch $P_\chi$.

In a liquid crystal display device having a plurality of layer domains of the type described, it is understood that the followings are conditions which make it difficult for the above-mentioned change to the reverse twist to take place. The first is that the twist angle is small between the top and the bottom substrate members. The second is that the chiral pitch is short, namely, that the liquid crystal material is subjected to a strong natural or inherent twist force.

These conditions result in the following. The small twist angle results in a wide twist angle, namely, in an angle of 180° minus the first-mentioned twist angle, after the change to the reverse twist takes place. In other words, the small twist angle is stabler in energy than the wider twist angle. This makes it difficult for the change to the reverse twist to occur. The short chiral pitch means that the liquid crystal material has a strong tendency of automatically twisting in a predetermined direction. This makes it difficult for the change to the reverse twist to take place.

Figure 19:
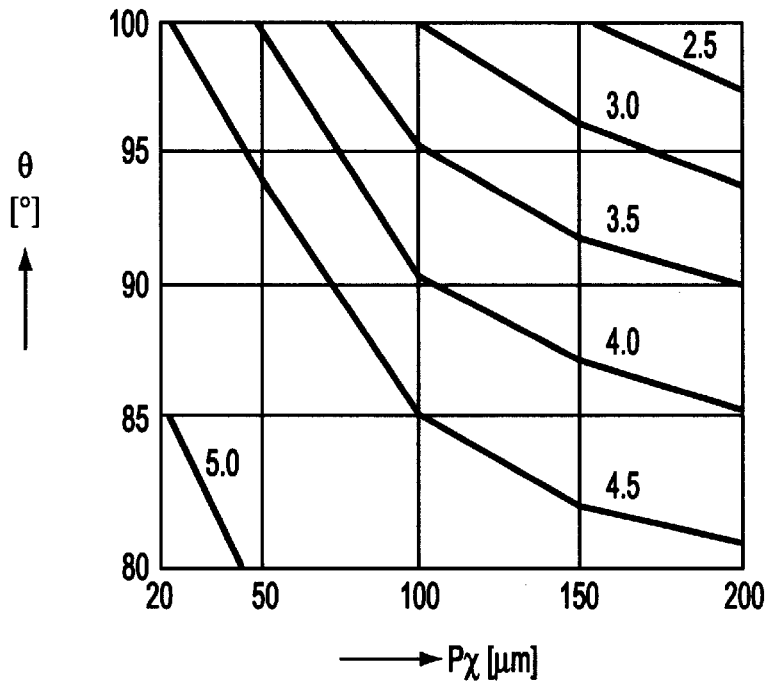
FIG. 19 shows characteristics of the liquid crystal display device depicted in FIG. 15.

Referring to FIG. 19 with FIGS. 2 and 15 through 17 again referred to, the abscissa shows the chiral pitch $P_\chi$ of the nematic liquid crystal materials mentioned in conjunction with FIG. 16. The ordinate shows the twist angle which is denoted by θ (in degree) and was measured between the top and the bottom alignment films 35. Between the top and the bottom transparent electrodes 33, the voltage V (in volt) was gradually raised. Upper limits of the voltage was observed at which the change to the reverse twist took place. Such upper voltage limits are depicted by polygonal lines.

For various nematic liquid crystal materials and for various twist angles, FIG. 19 shows voltage ranges in which the liquid crystal materials are operable with no change to the reverse twist. It has been understood that the voltage range is wide when the chiral pitch is shorter and when the twist angle is smaller. In other words, orientations of the liquid crystal materials are stable in the layer domains in such voltage ranges.

Figure 20:
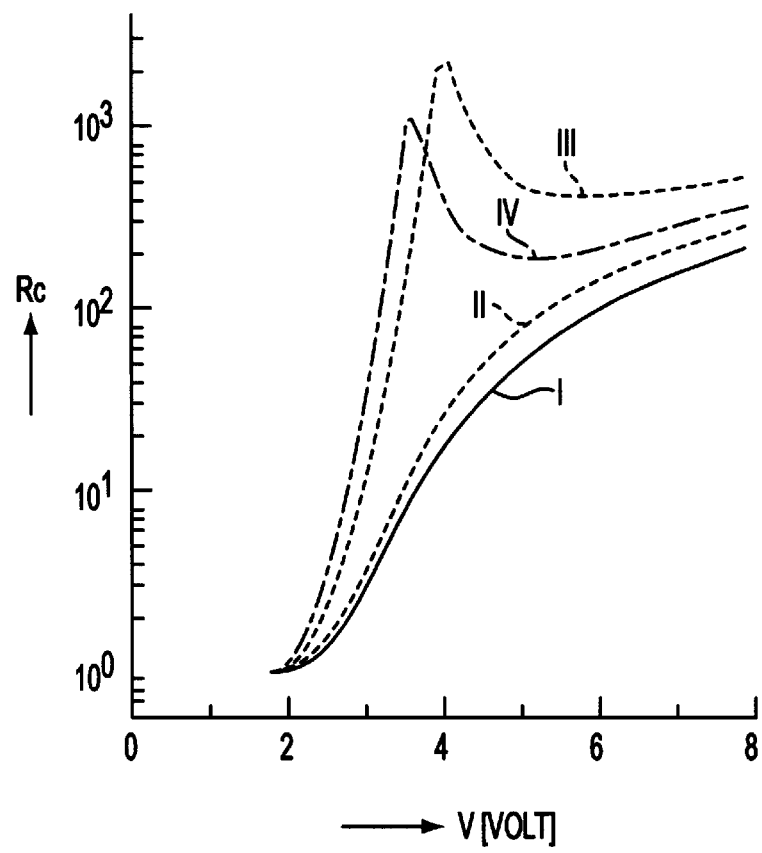
FIG. 20 shows different characteristics of the liquid crystal display device illustrated in FIG. 15.

Turning to FIG. 20 with FIGS. 2 and 15 through 17 continuously referred to, the abscissa shows the voltage V (in volt) applied across the top and the bottom transparent electrodes 33. The ordinate represents a contrast ratio Rc of the liquid crystal display which is displayed by the liquid crystal display device illustrated with reference to FIGS. 2 and 15 with first through fourth kinds I to IV of the nematic liquid crystal materials used. Of the nematic liquid crystal materials, the chiral pitches in micrometers and the twist angles between the top and the bottom alignment films 35 in degree are: for the first kind I, 50 and 80: for the second kind II, 200 and 80; for the third kind III, 50 and 100; and for the fourth kind IV, 200 and 100.

In order to obtain results depicted in FIG. 20, various liquid crystal devices of such types were tested. This is because the liquid crystal devices are not practically useful without attainment of the contrast ratio of a sufficient value within the voltage however stable may be the orientations of the liquid crystal material in two adjacent ones of the layer domains.

It has been understood from FIG. 20 that a high contrast ratio is achieved with a low voltage when the chiral pitch is longer and when the twist angle is wider. That is, a longer chiral pitch and a wider twist angle are desirable in contrast to the shorter chiral pitch and the narrower twist angle which are desirable as far as the change to the reverse twist should be avoided.

Figure 21:
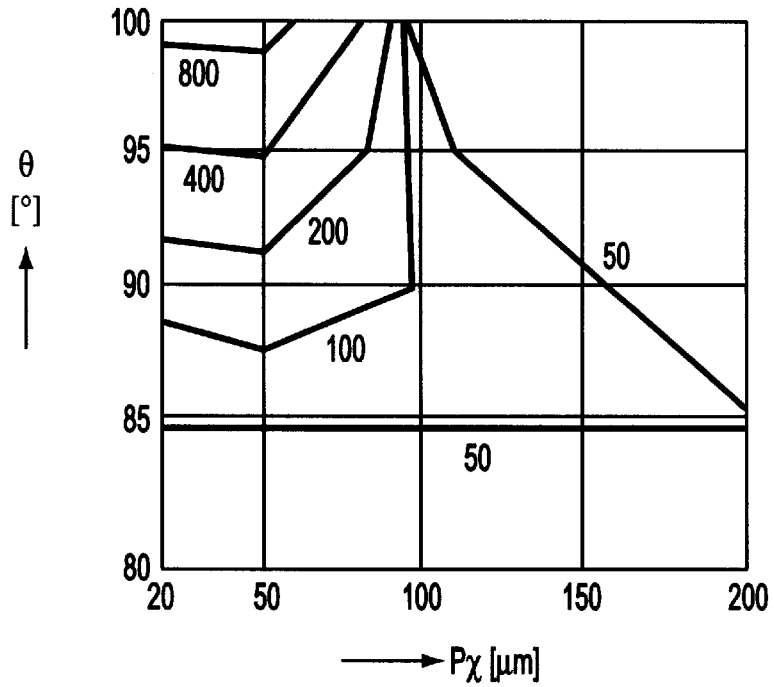
FIG. 21 shows further different characteristics of the liquid crystal display device depicted in FIG. 15.

Further turning to FIG. 21 with FIGS. 2 and 15 still further continuously referred to, the chiral pitch $P_\chi$ and the twist angle θ are scaled along the abscissa and the ordinate in micrometer and in degree. The voltage V was varied to achieve a sufficient contrast ratio without giving rise to the change to the reverse twist. Highest contrast ratios were attained in the manner depicted by polygonal lines with the highest contrast ratios labelled.

From FIG. 21, it is understood in connection with the example being illustrated that the twist angle should be between 88° and 100° and that the chiral pitch should be between 20 micrometers and 100 micrometers. This is because the twist angle of 88° or wider and the chiral pitch of 100 micrometers or shorter are necessary in order to completely avoid the change to the reverse twist and to keep the contrast ratio of 100. An upper limit of the twist angle and a lower limit of the chiral pitch are determined as described in the foregoing.

Figure 22:
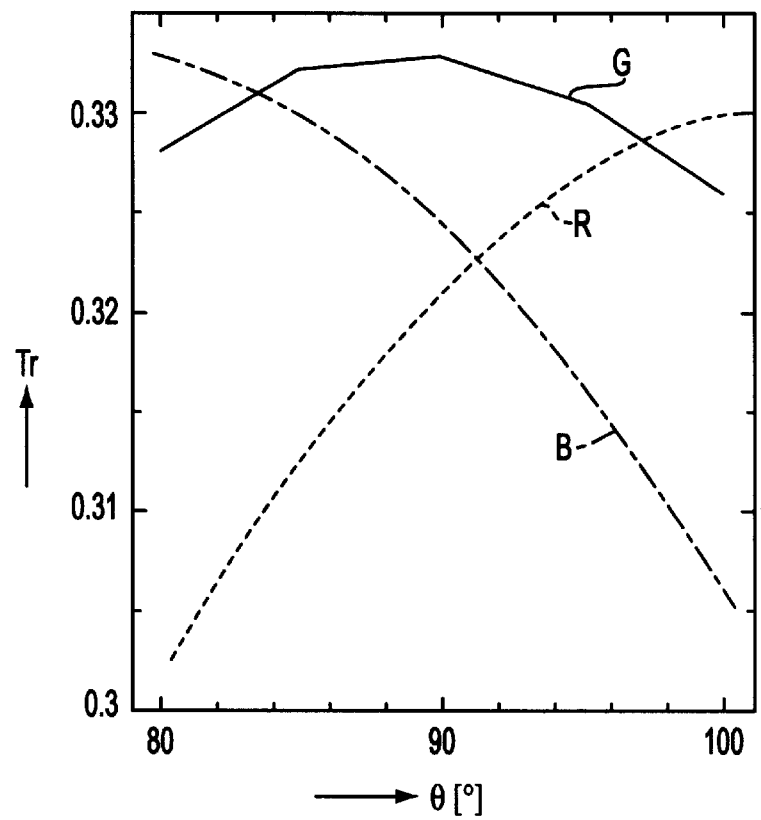
FIG. 22 exemplifies color characteristics of the liquid crystal display device shown in FIG. 15.

Still further turning to FIG. 22 with FIGS. 2 and 15 through 17 yet further continuously referred to, the abscissa shows the twist angle θ in degree between the top and the bottom alignment films 25. The ordinate shows on an arbitrary scale a transmittance Tr of the liquid crystal display device illustrated with reference to FIGS. 2 and 15 through 17. More particularly, the liquid crystal display device was designed with attention directed to light of the green. The transmittance is depicted by curves labelled R, G, and B by measuring, for incident light beams of the red, the green, and the blue, intensities of light beams transmitted through the liquid crystal device. These curves are plotted for the red, the green, and the blue light of wavelengths which were 620 nm, 550 nm, and 460 nm as measured by an interference filter.

It is understood from FIG. 22 that the transmittance does not vary to a great extent for the green light and much varies for the red and the blue light. When the twist angle is not either greater than 80° or smaller than 100°, a difference between the transmittances exceeds 10 percent of the incident light beams of the red and the blue. That is, the liquid crystal device has a greater chromatic dependency to make it impossible to faithfully and reliably display colors when the twist angle exceeds a range between 80° and 100°. This undesirable tendency becomes greater when the liquid crystal display device is designed for light of colors other than the green.

Reviewing FIGS. 2 and 12 through 22, it has been confirmed that the twist angle should preferably be between 80° and 100° and that the chiral pitch should preferably be between 20 micrometers and 200 micrometers. The twist angle is so decided in order to prevent the change to the reverse twist from taking place in the liquid crystal material orientations and to attain an excellent color reproducibility. This chiral pitch of 20 micrometers is equal to about four times a thickness of 5 micrometers of the liquid crystal material in a generally used liquid crystal display device of a twist nematic type, through which thickness the twist angle becomes equal to 90° in the liquid crystal material of the twist nematic type. When the chiral pitch is shorter than 20 micrometers, use is practically impossible. Moreover, a high voltage becomes indispensable as shown in FIG. 20 in order to render the contrast ratio sufficient. The chiral pitch of 200 micrometers is equal to about forty times the thickness of the generally used liquid crystal display device. The chiral pitch of longer than 200 micrometers allows the change to the reverse twist to undesiredly readily occur and makes it impossible to attain the sufficient contrast ratio. By these value ranges of the twist angle and of the chiral pitch, the energy of the liquid crystal material orientations is stabilized in the layer domains.

Referring once more to FIGS. 2 and 15 through 17, the liquid crystal display device is similar in structure according to a second embodiment of this invention to that illustrated with reference to FIGS. 1, 2, 4, and 9. The top alignment film 35(1) is made of the polyimide which gives a narrower angle of about 1.5° to the angle of build up of the liquid crystal material orientations. The bottom alignment film 35(2) of each pixel is first made of the polyimide used as the top alignment film 35(1). By using mask printing, halves (each 75 micrometers wide as above) of the bottom alignment films 35(2) are subsequently covered with the polyimide which gives a wider angle of 3.5° to the angle of build up.

Thereafter, the top and the bottom alignment films 35 and subjected to the rubbing processes in the manner listed in Table under the indications of 35(1) and 35(2)II to manufacture various liquid crystal display devices. Each of these liquid crystal devices comprises the first and the second layer domains. The characteristics were as described with reference to FIG. 21.

Referring further once more to FIGS. 2 and 15 through 17, the liquid crystal display device is similar in structure according to a third embodiment of this invention to that illustrated with reference to FIGS. 1, 2, 6, and 11. On the top glass substrate 31(1), use was made, as counter electrodes in correspondence to the bottom transparent electrodes 33(2) depicted in FIG. 15, portions of the top transparent electrode 33(1) which are 5 micrometers longer along each side than the bottom transparent electrodes 35(2). This is in order to obtain an electric field depicted in FIG. 11. The rubbing processes were applied to the top and the bottom alignment films 35 as listed in Table under the indications of 35(1) and 35(2)II.

In liquid crystal display devices thus manufactured, the angle of the build up was 1.5°. The characteristics were as described in connection with FIG. 21.

Figure 23:
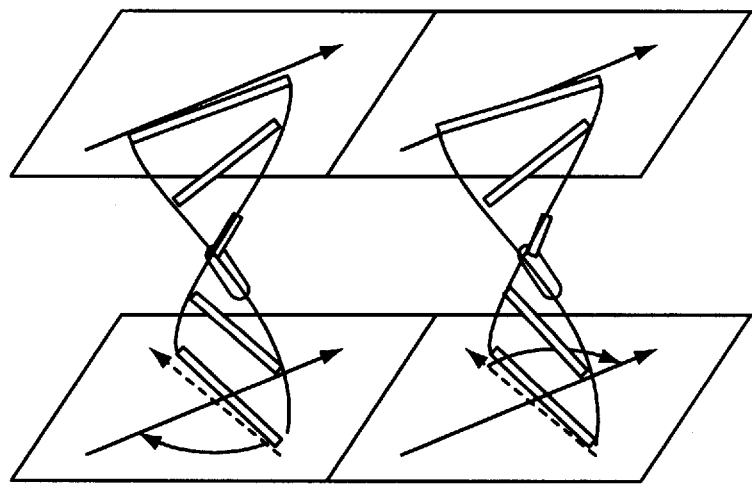
FIG. 23 is a perspective view of a pixel of a liquid crystal display device according to a second embodiment of this invention.

Referring now to FIG. 23 and once again to FIGS. 2, 15, and 16, the liquid crystal display device is similar in structure according to a fourth embodiment of this invention to that illustrated with reference to FIGS. 1 and 2. In the manner described before in conjunction with FIGS. 7 and 8 and also with FIGS. 9 through 11, the alignment control force builds up in each of the first and the second layer domains I and II. The alignment control force forms a build up angle relative to each of the top and the bottom alignment film 35. The build up angle is not different from the pretilt angle.

In the example being illustrated, the top and the bottom alignment films 35 are subjected to the rubbing processes at the first and the second film domains I and II so as to make the build up angle have an angle between 0° and 1.5°. It should be noted in the first and the second layer domains of FIG. 23 that top orientations have their left ends on the top substrate member and their right ends lower by the build up angle than the top substrate member. Bottom orientations have their right ends on the bottom substrate member and their left ends higher by the build up angle than the bottom substrate member.

The build up angle of a range between 0° and 1.5° stabilizes the energy of the π-type pretilt and of the normal twist. This is attained for the liquid crystal display device of Koike et al or by Takatori et al by reducing the pretilt angle in FIG. 9 or 10 of a smaller angle to make the structure of the π-type pretilt have the energy which is substantially identical as regards the pretilt and with that of the normal pretilt. For the liquid crystal display device of Lien et al, the pretilt angle is substantially equal in absolute value at the first and the second alignment films 35 as described in conjunction with FIG. 11. In this case, these both pretilt angles are further reduced to the build up angle so as to stabilize the structure of the π-type pretilt.

Figure 24:
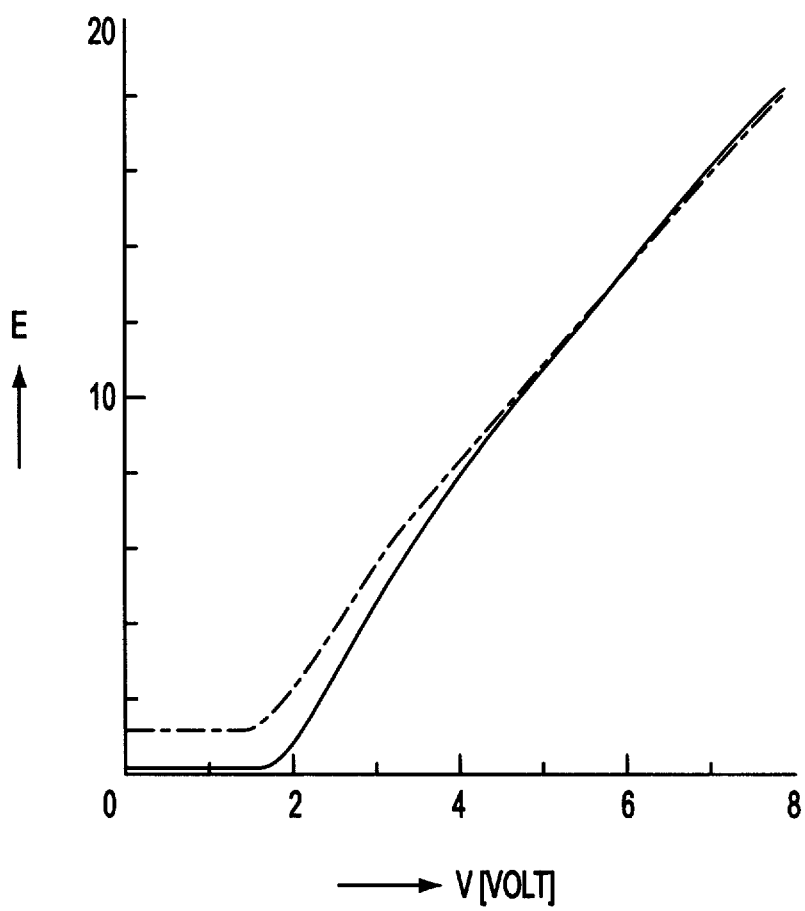
FIG. 24 shows different characteristics of the general liquid crystal display device.

Turning to FIG. 24 with FIGS. 2, 15 through 17, and 23 additionally referred to, energy E is calculated like in FIG. 14 for various voltages V applied across the transparent electrodes 33. The energy is depicted by a solid-line curve as regards the structure of the π-type pretilt and of the normal twist and by a dashed-line curve for the structure of the normal pretilt and of the reverse twist.

It is understood by comparison with FIG. 14 that the energy of the π-type pretilt and normal twist structure is stable in a wider range. The build up angle between 0° and 1.5° additionally raises the contrast ratio.

It is clear from the conventional liquid crystal display devices that the build up angle of 0° is preferred. When the build up angle exceeds 1.5°, it becomes difficult to keep the contrast ratio at 100 or higher even when the twist angle is between 80° and 100° and when the chiral pitch is between 20 micrometers and 200 micrometers as discussed above in conjunction with FIG. 21. The build up angle between 0° and 1.5° is consequently more preferable.

Referring more particularly to FIGS. 2, 15 through 17, and 23, the liquid crystal display device is similar in structure to that illustrated with reference to FIGS. 1, 2, 5, and 10. By subjecting the top alignment film 35(1) to various rubbing processes, various liquid crystal display devices were manufactured in which the liquid crystal material orientations build up from the top alignment film 35(1) with angles of 2.0° (for reference), 1.0°, 0.5°, and 0.0°.

Figure 25:
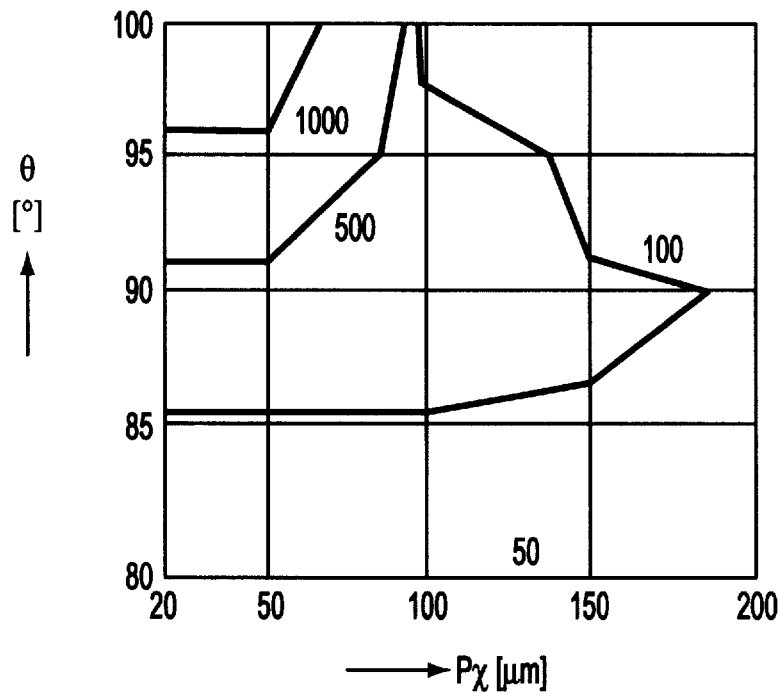
FIG. 25 shows characteristics of a liquid crystal display device according to a second embodiment of this invention.

Turning to FIG. 25 with FIGS. 2, 15 through 17 and 23 additionally referred to, the chiral pitch $P_\chi$ and the twist angle θ are scaled along the abscissa in micrometer and along the ordinate in degree. An angle of 1.0° was used as the angle of build up of the liquid crystal orientations at the top substrate member. Under conditions such that the change to the reverse twist did not occur at all when the twist angle was varied, highest contrast ratios were measured and are depicted by polygonal lines with labels representative of the highest contrast ratios.

When compared with FIG. 21 for which the angle of build up is 1.5°, FIG. 25 clearly shows that the contrast ratio of 100 or higher is achieved in a wider area. When the twist angle is 90°, the contrast ratio of 100 is attained when the chiral pitch is shorter than about 180 micrometers.

Figure 26:
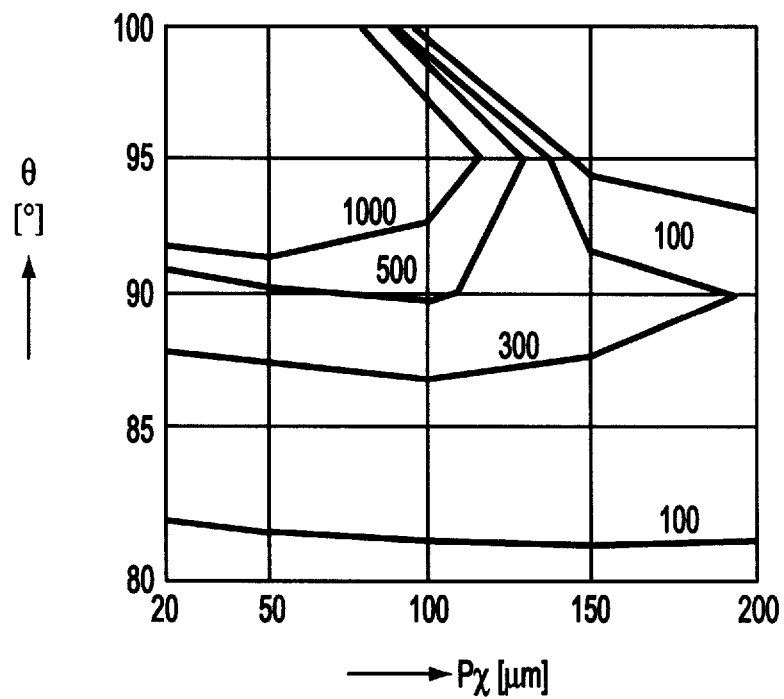
FIG. 26 shows characteristics of a liquid crystal display device according to a modification of the second embodiment of this invention.

Further turning to FIG. 26 with FIGS. 2, 15 through 17, and 23 continuously referred to, the chiral pitch $P_\chi$ and the twist angle θ are scaled along the abscissa and the ordinate like in FIG. 25. Another angle of 0.5° was used as the angle of build up. The highest contrast ratios attainable are depicted by polygonal lines. A range of the contrast ratio of 100 or higher is wider than in FIG. 25.

Although results are not illustrated, the highest contrast ratios were measured with a still another angle of 0.0° used as the angle of build up. It was possible to insure the contrast ratio of 100 or higher when the twist angle and the chiral pitch are between 80° and 100° and between 20 micrometers and 200 micrometers. Incidentally, it was impossible to achieve the contrast ratio of 100 if the angle of build up is 2.0°.

Referring once more to FIGS. 2, 15 through 17 and 23, a liquid crystal display device is similar in structure according to a fifth embodiment of this invention to one that is described in the foregoing. When compared with the conventional liquid crystal display devices, this liquid crystal display device is similar to that described with reference to FIGS. 1, 2, 4, and 9. In other words, rhomic evaporation deposition is used on forming the top and the bottom alignment films 35 with two different rubbing directions used.

More particularly, silicon oxide (SiO) was evaporated both on the top and the bottom transparent electrodes 33. On describing a direction in which silicon oxide was evaporated, attention will be directed to a normal to each of the top and the bottom transparent electrodes 33 and to an orthogonal projection of the normal on each of the transparent electrodes 33.

For the top transparent electrode 33(1), the direction was 60° relative to the normal. Orthogonal projections of such directions were orthogonal to the azimuthal directions listed in the Table under the indication of 35(1). For the bottom transparent electrode 33(2), the direction was 60° relative to the normal. Orthogonal projection of such latter directions were orthogonal to the azimuthal directions listed in Table under the indication of 35(2)II. The liquid crystal material had orientations which form an angle of 0.0 relative to each of the azimuthal directions listed in Table under the indication of 35(2).

On halves (each 75 micrometers wide) of the bottom alignment film 35(2) under fabrication in the manner described in the foregoing, mask printed were stripes of an overlying film (not shown) of polyimide which gives about 3.5 to the angle of build up. Subsequently, the rubbing processes were applied to the top alignment film 35(1) in the azimuthal directions listed in Table under the indication 35(1) and to the bottom alignment films 35(2) in the azimuthal directions listed in Table under the indication 35(2) to provide various liquid crystal display devices. With each of the liquid crystal display devices thus manufactured, it was confirmed that the contrast ratio of 100 was insured with the twist angle between 80° and 100° and the chiral pitch between 20 micrometers and 200 micrometers.

Reviewing FIGS. 2 and FIGS. 12 through 26, it has furthermore been confirmed that the liquid crystal display devices are operable irrespective of ambient temperature variations. Such a liquid crystal display device was placed in a thermostat and was kept at 0° C., 20° C., 40° C., and 60° C., with use of the liquid crystal material which remained in a nematic state between about −40° C. and about 80°C. When other materials and processes of treating were to insure the twist angle between 80° and 100° and the chiral pitch between 20 micrometers and 200 micrometers, no adverse affects were brought about.

While this invention has thus far been described in specific conjunction with a few preferred embodiments thereof, it will now be readily possible for one skilled in the art to carry this invention into effect in various other manners. For example, it is possible to use a transparent plate or film as each of the first or top glass substrate 31(1) and the second or bottom glass substrate 31(2). The azimuthal angles in Table between 310° and 320° for the domain 35(1) and between 230° and 220° (and accordingly between 50° and 40°) merely show typical examples.

The article "Splayed TN Configuration Stability in Domain-Divided TN Mode", *Mol. Cryst. Lia. Cryst.*, 1995, pp. 445–458 is incorporated herein by reference.

What is claimed is:

1. A liquid crystal display device comprising a first and a second substrate member and a layer of a liquid crystal material between said first and said second substrate members with said first and said second substrate members processed to divide said layer into a plurality of layer domains, said plurality of layer domains include a first layer domain having a first direction of liquid crystal orientation and a second layer domain having a second direction of liquid crystal orientation, wherein said first and second layer domains are adjacent and, said first and second directions of liquid crystal orientation are different, wherein said first and said second layer domains are formed to form a twist angle between 80° and 100° between said first and second directions with each of said first and said second directions given a chiral pitch between 20 micrometers and 200 micrometers;

wherein said liquid crystal material is a nematic liquid crystal material to which chiral molecules are added to achieve said chiral pitch;

said first substrate member comprising a first alignment film, said second substrate member comprising a second alignment film in an array of columns and rows, said layer of liquid crystal material being interposed between said first alignment film and said second alignment films, the second alignment films of each of said rows defining a first and a second stripe, said columns defining an azimuthal angle, said first and said second layer domains being interposed between said first alignment film and each of said second alignment films along said first and said second stripes, respectively, wherein:

said first substrate member is processed to provide said first and said second layer domains by subjecting said first alignment film to a first rubbing process in a first rubbing direction of a first aximuthal direction selected from aximuthal angles of 310°, 312.5°, 315°, 317.5°, and 320°;

said second substrate member being processed to provide said first and said second layer domains, in cooperation with said first rubbing process, by subjecting each first stripe of said second alignment films to a second primary rubbing process in a second primary rubbing direction of a second azimuthal direction selected from azimuthal angles of 230°, 227.5°, 225°, 222.5°, and 220°, and by subjecting each second stripe of said second alignment films to a second secondary rubbing process in a second secondary direction which is antiparallel to said second primary direction, the azimuthal angles of 230°, 227.5°, 225°, 222.5°, and 220° being selected when the azimuthal angles of 310°, 312.5°, 315°, 317.5°, and 320° are selected, respectively;

wherein said second alignment films are made in said first stripe of polyimide which gives a build up angle of about 1.5° to said liquid crystal orientations, said second alignment films being made in said second stripe of polyimide which gives another build up angle of about 3.5° to said liquid crystal orientiations.

2. A method of manufacturing a liquid crystal display device comprising the steps of preparing a first and a second substrate member and filling a layer of a liquid crystal material between said first and said second substrate members with said first and said second substrate members processed during said preparing step to divide said layer into a plurality of layer domains, said plurality of layer domains include a first layer domain having a first direction of crystal orientation and a second layer domain having a second direction of liquid crystal orientation, wherein said first and second layer domains are adjacent and, said first and second directions of liquid crystal orientation are different, wherein said first and said second substrate members are processed in said preparing step to form between said first and said second directions a twist angle between 80° and 100° with each of said first and said second directions given a chiral pitch between 20 micrometers and 200 micrometers;

said preparing step comprising the step of forming a first alignment film as a part of said first substrate member and, as parts of said second substrate member, a second alignment film in an array of columns and rows, said filling step filing said layer of liquid crystal material between said first alignment film and said second alignment films, the second alignment films of each of said rows defining a first and a second stripe, said columns defining an azimuthal angle, said first and said second layer domains being interposed between said first alignment film and each of said second alignment films along said first and said second stripes, respectively, wherein said forming step comprises the steps of:

subjecting said first alignment film to a first rubbing process in a first rubbing direction of a first azimuthal direction selected from azimuthal angles of 310°, 312.5°, 315°, 317.5°, and 320°;

subjecting each first stripe of said second alignment films to a second primary rubbing process in a second primary rubbing direction of a second azimuthal direction selected from azimuthal angles of 230°, 227.5°, 225°, 222.5°, and 220°, the azimuthal angles of 230°, 227.5°, 225°, 222.5° and 220° being selected when the azimuthal angles of 310°, 312.5°, 315°, 317.5°, and 320° are selected, respectively; and subjecting each second stripe of said second alignment films to a second secondary rubbing process in a second secondary direction which is antiparallel to said second primary direction, said first and said second layer domains being interposed between the first alignment film subjected to said first rubbing process and the first and the second stripes which are subjected in each of said second alignment films to said second primary and secondary rubbing processes, respectively;

wherein said second alignment films are made in said first stripe of polyimide which gives a build up angle of about 1.5° to said liquid crystal orientiations, said second alignment films being made in said second stripe of polyimide which gives another build up angle of about 3.5° to said liquid crystal orientiations.

3. A method of manufacturing a liquid crystal display device comprising the steps of preparing a first and a second substrate member and filling a layer of a liquid crystal material between said first and said second substrate members with said first and said second substrate members processed during said preparing step to divide said layer into a plurality of layer domains, said plurality of layer domains include a first layer domain having a first direction of crystal orientation and a second layer domain having a second direction of liquid crystal orientation, wherein said first and second layer domains are adjacent and, said first and second directions of liquid crystal orientation are different, wherein said first and said second substrate members are processed in said preparing step to form between said first and said second directions a twist angle between 80° and 100° with each of said first and said second directions given a chiral pitch between 20 micrometers and 200 micrometers;

wherein said first and said second substrate members are processed in said preparing step to make an alignment control force build up in said first and said second layer domains from a surface of at least one of said first and said second substrate members with a build up angle between 0° and 1.5°;

wherein said second alignment films are made in said first stripe of polyimide which gives a build up angle of about 1.5° to said liquid crystal orientiations, said second alignment films made in said stripe of polyimide which gives another build up angle of about 3.5° to said liquid crystal orientiations.

4. A liquid crystal display device comprising a first and a second substrate member and a layer of a liquid crystal material between said first and said second substrate members with said first and said second substrate members processed to divide said layer into a plurality of layer domains, in a first and a second layer domain of two adjacent ones of said layer domains a first orientation direction of liquid crystal orientations is different from a second orientation direction of liquid crystal orientations, wherein said first and said second layer domains are formed to form a twist angle between 80° and 100° between said first and said second orientation directions with each of said first and said second orientation directions, said liquid crystal material having a chiral pitch between 20 micrometers and 200 micrometers, wherein said liquid crystal material is a nematic liquid crystal material to which chiral molecules are added to achieve said chiral pitch, said first substrate member comprising a first alignment film, said second substrate member comprising a plurality of second alignment films in an array of columns and rows, said layer of liquid crystal material being interposed between said first alignment film and said second alignment films, the second alignment films of each of said rows defining a first and a second stripe, said columns defining an azimuthal angle, said first and said second layer domains being interposed between said first alignment film and each of said second alignment films along said first and said second stripes, respectively, wherein:

said first substrate member is processed to provide said first and said second layer domains by subjecting said first alignment film to a first rubbing process in a first rubbing direction of a first azimuthal 0 0 direction selected from azimuthal angles of 310°, 312.5°, 315°, 317.5°, and 320°;

said second substrate member being processed to provide said first and said second layer domains, in cooperation with said first rubbing process, by subjecting each first stripe of said second alignment films to a second primary rubbing process in a second primary rubbing direction of a second azimuthal direction selected from azimuthal angles of 230°, 227.5°, 225°, 222.5°, and 220°, and by subjecting each second stripe of said second alignment films to a second secondary rubbing process in a second secondary direction which is antiparallel to said second primary direction, the azimuthal angles of 230°, 227.5°, 225°, 222.5°, and 220° being selected when the azimuthal angles of 310°, 312.5°, 315°, 317.5°, and 320° are selected, respectively, said second alignment films being made in said first stripe of polyimide which gives a build-up angle of about 1.5° to said liquid crystal orientations, said second alignment films being made in said second stripe of polyimide which gives another build-up angle of about 3.5° to said liquid crystal orientations.

5. A method of manufacturing a liquid crystal display device comprising the steps of preparing a first and a second substrate member and filling a layer of a liquid crystal material between said first and said second substrate members with said first and said second substrate members processed during said preparing step to divide said layer into a plurality of layer domains, in a first and a second layer domain of two adjacent ones of said layer domains a first orientation direction of liquid crystal orientations is different from a second orientation direction of liquid crystal orientations, wherein said first and said second substrate members are processed in said preparing step to form between said first and said second orientation directions a twist angle between 80° and 100° with each of said first and said second orientation directions, said liquid crystal material having a chiral pitch between 20 micrometers and 200 micrometers, said preparing step comprising the step of forming a first alignment film as a part of said first substrate member and, as parts of said second substrate member, a plurality of second alignment films in an array of columns and rows, said filling step filling said layer of liquid crystal material between said first alignment film and said second alignment films, the second alignment films of each of said rows defining a first and a second stripe, said columns defining an azimuthal angle, said first and said second layer domains being interposed between said first alignment film and each of said second alignment films along said first and said second stripes, respectively, wherein said-forming step comprises the steps of:

subjecting said first alignment film to a first rubbing process in a first rubbing direction of a first azimuthal direction selected from azimuthal angles of 310°, 312.5°, 315°, 317.5°, and 320°;

subjecting each first stripe of said second alignment films to a second primary rubbing process in a second primary rubbing direction of a second azimuthal direction selected from azimuthal angles of 230°, 227.5°, 225°, 222.5°, and 220°, the azimuthal angles of 230°, 227.5°, 225°, 222.5°, and 220° being selected when the azimuthal angles of 310°, 312.5°, 315°, 317.5°, and 320° are selected, respectively; and subjecting each second stripe of said second alignment films to a second secondary rubbing process in a second secondary direction which is antiparallel to said second primary direction, said first and said second layer domains being interposed between the first alignment film subjected to said first rubbing process and the first and the second stripes which are subjected in each of said second alignment films to said second primary and secondary rubbing processes, respectively, said second alignment films being made in said first stripe of polyimide which gives a build-up angle of about 1.5½ to said liquid crystal orientations, said second alignment films being made in said second stripe of polyimide which gives another build-up angle of about 3.5° to said liquid crystal orientations.

6. A method of manufacturing a liquid crystal display device comprising the steps of preparing a first and a second substrate member and filling a layer of a liquid crystal material between said first and said second substrate members with said first and said second substrate members processed during said preparing step to divide said layer into a plurality of layer domains, in a first and a second layer domain of two adjacent ones of said layer domains a first orientation direction of liquid crystal orientations is different from a second orientation direction of liquid crystal orientations, wherein said first and said second substrate members are processed in said preparing step to form between said first and said second orientation directions a twist angle between 80° and 100° with each of said first and said second orientation directions, said liquid crystal material having a chiral pitch between 20 micrometers and 200 micrometers, wherein said first and said second substrate members are processed in said preparing step to make an alignment control force build-up in said first and said second layer domains from a surface of at least one of said first and said second substrate members with a build-up angle between 0° and 1.5°, said second alignment films being made in said first stripe of polyimide which gives a build-up angle of about 1.5° to said liquid crystal orientations, said second alignment films made in said stripe of polyimide which gives another build-up angle of about 3.5° to said liquid crystal orientations.

* * * * *